May 18, 1954  S. M. MASTON  2,678,512
MINNOW BUCKET
Filed Aug. 11, 1950

Seth M. Maston
INVENTOR.

Patented May 18, 1954

2,678,512

UNITED STATES PATENT OFFICE 2,678,512

MINNOW BUCKET

Seth M. Maston, Wellston, Okla.

Application August 11, 1950, Serial No. 178,956

1 Claim. (Cl. 43—57)

This invention comprises novel and useful improvements in a minnow bucket and more specifically pertains to an improved container for aerating and maintaining agitation of the water therein to thereby keep the minnows in the bucket alive for considerable periods of time.

The primary object of this invention is to provide an improved minnow bucket having incorporated therein improved means for agitating and aerating the water.

A further object of the invention is to provide an improved minnow bucket in conformity with the preceding object wherein the water circulating and aerating means is so positioned as to maintain different degrees of aeration and circulation of the water throughout the bucket whereby the minnows may select the optimum conditions for their comfort and well being, thus improving the condition and prolonging the life of the minnows.

Yet another object of the invention is to provide an improved minnow bucket in accordance with the preceding objects wherein the aerating and agitating means may be supported entirely by the cover of the device and mounted in the bucket in a novel and improved manner; together with a hinged perforated lid for obtaining access to the contents of the bucket.

Figure 1:
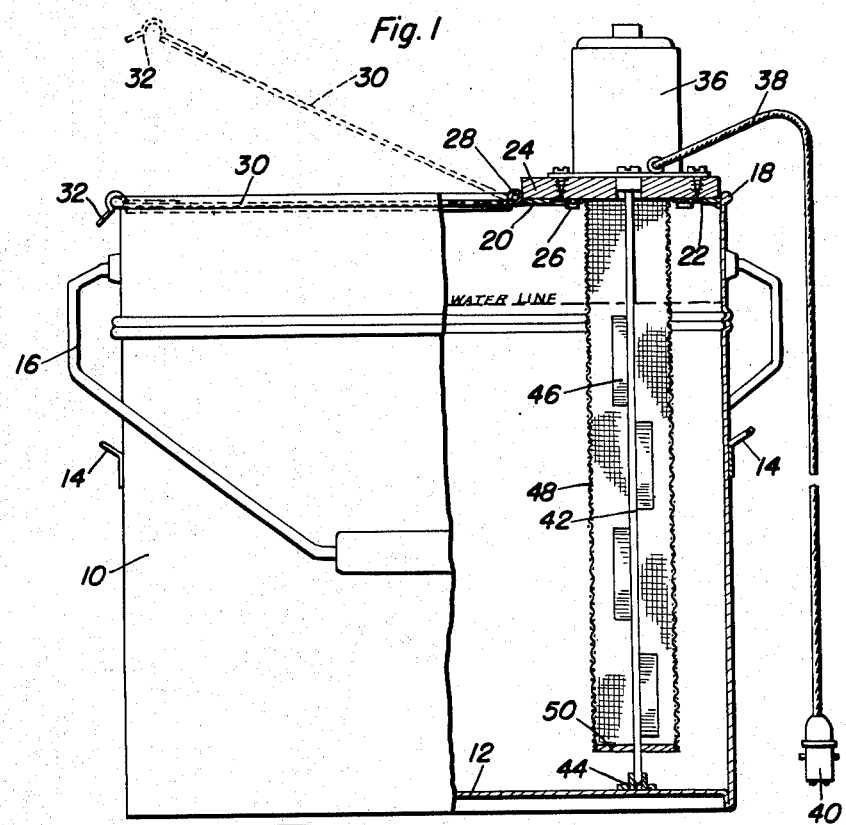
Figure 2:
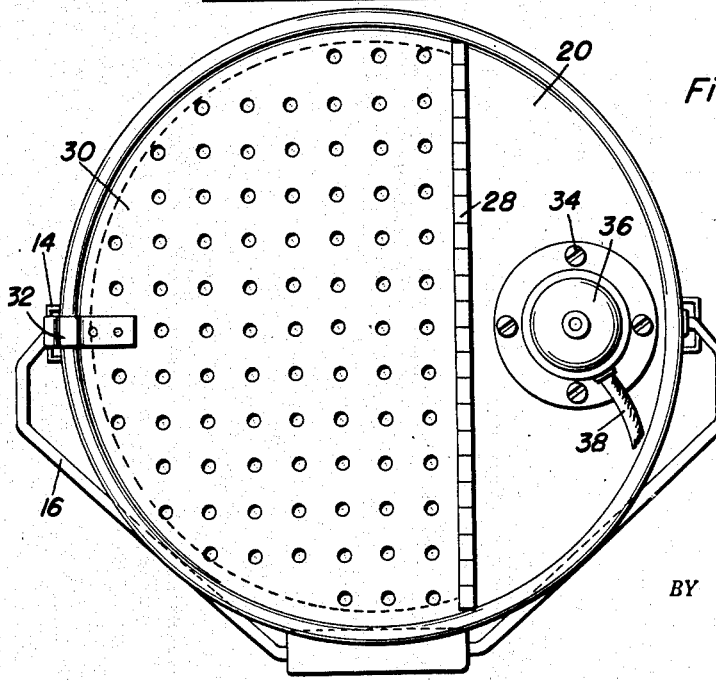

These, together with various ancillary features and objects of the invention, which will later become apparent as the following description proceeds, are attained by the present invention, a preferred embodiment of which has been illustrated, by way of example only, in the accompanying drawings, wherein:

Figure 1 is a side elevational view of one embodiment of minnow bucket incorporating therein the principles of this invention, parts being broken away and shown in section, and the raised position of the lid of the bucket being indicated in dotted lines therein; and Figure 2 is a top plan view of the minnow bucket of Figure 1.

Referring more specifically to the accompanying drawings, wherein like numerals designate similar parts throughout the various views, it will be seen that numeral 10 designates generally any suitable container such as a cylindrical pail or the like, having a bottom wall 12 together with hold-down brackets 14 and a supporting handle or bail 16. The upper end of the bucket is provided with a rim 18 and has a metal cover plate 20 extending over a portion of the area of the bucket and firmly secured thereto in any desired manner. This lid 20 is provided with an opening or aperture 22, and a support in the form of a wooden block 24 of any other suitable member is secured to the cover over this opening as by fastening screws or the like 26. It will thus be apparent from Figures 1 and 2 that the cover 20 which is imperforate and may be of metal or the like is disposed adjacent the side wall of the bucket, and the opening 22 with the support plate 24 thereover is likewise disposed adjacent the side wall of the bucket.

The cover 20 has a straight edge extending chordally of the bucket and having a hinge 28 by means of which there is attached and secured a perforated lid or closure 30 having a resilient fastener 32 secured thereto and adapted to resiliently and frictionally grasp the rim 18 of the bucket for yieldingly retaining the lid in its closed position.

Mounted upon the top of the support plate 24 as by fastening screws 34, is a conventional form of electric motor 36 which is adapted to be supplied with current by the electric conductor 38 having a switch and plug 40, which is adapted to be connected to any suitable source of electric current such as the electric system or storage battery of a motor vehicle.

An agitator is provided, connected to the motor 36 for aerating and agitating the water contained in the container 10. The agitator consists of a propeller shaft 42 which is secured to the armature of the motor 36, extends through the support plate 24 and has its lower end journaled in a journal bearing 44 mounted upon the bottom wall 12 of the container. Suitable agitator blades or propeller vanes 46 are provided upon the shaft 42. A guard screen 48 in the form of a reticulated cylinder is provided which surrounds the propeller shaft 42 and has its upper end flanged and secured to the undersurface of the support plate 24 by the above mentioned fastening screws 26. The lower end of the guard screen is closed as by a plate 50 through which is journaled the propeller shaft 42.

By virtue of the position of the agitator in the bucket, it will be seen that the most agitated region of the liquid in the bucket is located immediately adjacent the agitator blades and the guard screen, while progressively less agitation or turbulence occurs in the bucket at distances more remote from the propeller shaft. This agitation is necessarily accompanied by a certain amount of aeration of the liquid in the bucket due to the turbulence and agitation of the surface of the liquid which thereby entraps air to which the surface of the liquid is exposed. Accordingly, the minnows contained within the water in the bucket may select that portion or location within the bucket in which the agitation and degree of aeration are most satisfactory for their needs, thereby enabling the minnows to be maintained in an optimum condition with an increased life.

The minnow bucket is specifically designed for portability, and the motor 36 is preferably a 6-volt direct current motor which is capable of operation from the conventional electric systems of motor vehicles and the like.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claim.

Having described the invention, what is claimed as new is:

A substantially cylindrical minnow bucket provided with a two-part lid, one part of the lid being fixed to the peripheral edge of the top of the bucket, said fixed part having an inner edge constituting a chord of the lid less than the diameter thereof, the remaining part of the lid being hinged to the inner edge of the first part and provided with a latch to maintain it in closed position relative to the bucket, said fixed part having an aerating device mounted thereon and including a propeller extending into said bucket, whereby the propeller is closely adjacent an inner wall surface of the bucket so as to permit a major portion of the interior of the bucket to be free of physical obstacles therein.

References Cited in the file of this patent
UNITED STATES PATENTS

| Number | Name | Date |
| --- | --- | --- |
| 53,876 | Robinson | Apr. 10, 1866 |
| 366,650 | Danheiser | July 19, 1887 |
| 912,852 | Johnson | Feb. 16, 1909 |
| 1,381,355 | Siebert | June 14, 1921 |
| 1,383,380 | Boggs | July 5, 1921 |
| 2,243,498 | Candioto | May 27, 1941 |
| 2,364,636 | Balisteri et al. | Dec. 12, 1944 |